(12) United States Patent
Huber (10) Patent No.: US 11,273,898 B2
(45) Date of Patent: Mar. 15, 2022

(54) STRUCTURE-REINFORCING CARGO COMPARTMENT MODULE

(71) Applicant: TELAIR INTERNATIONAL GMBH, Miesbach (DE)

(72) Inventor: Thomas Huber, Schliersee (DE)

(73) Assignee: TELAIR INTERNATIONAL GMBH, Miesbach (DE)

( * ) Notice: Subject to any disclaimer, the term of this patent is extended or adjusted under 35 U.S.C. 154(b) by 0 days.

(21) Appl. No.: 17/103,270

(22) Filed: Nov. 24, 2020

(65) Prior Publication Data

US 2021/0163118 A1 Jun. 3, 2021

(30) Foreign Application Priority Data

Nov. 28, 2019 (DE) .......................... 102019132292.8

(51) Int. Cl.
*B64C 1/22* (2006.01)
*B64F 5/10* (2017.01)

(52) U.S. Cl.
CPC . *B64C 1/22* (2013.01); *B64F 5/10* (2017.01)

(58) Field of Classification Search
CPC .............. B64C 1/20; B64C 1/061; B64D 9/00
See application file for complete search history.

(56) References Cited

U.S. PATENT DOCUMENTS

| 3,861,541 | A | * | 1/1975 | Taft .......................... B64D 9/00 414/345 |
| 4,479,621 | A | | 10/1984 | Bergholz |
| 4,984,756 | A | | 1/1991 | Anders |
| 5,170,968 | A | | 12/1992 | Helmner |
| 8,157,210 | B2 | | 4/2012 | Huber et al. |
| 8,261,924 | B2 | * | 9/2012 | Karpisek ................ B65D 88/14 220/6 |
| 8,292,226 | B2 | * | 10/2012 | Sankrithi ................ B64C 1/068 244/119 |
| 9,139,283 | B1 | * | 9/2015 | Campbell ............... B64C 25/10 |
| 10,689,114 | B2 | | 6/2020 | Huber et al. |
| 2008/0029508 | A1 | * | 2/2008 | Kochanowski .... B65D 21/0215 220/1.5 |
| 2009/0294588 | A1 | | 12/2009 | Griess et al. |

(Continued)

FOREIGN PATENT DOCUMENTS

| DE | 3141869 | 5/1983 |
| DE | 3615927 | 11/1987 |

(Continued)

OTHER PUBLICATIONS

Search Report and Opinion issued in Appl. No. EP20209783 (dated Apr. 16, 2021).

*Primary Examiner* — Philip J Bonzell
*Assistant Examiner* — Michael B. Kreiner
(74) *Attorney, Agent, or Firm* — Barnes & Thornburg LLP (57) ABSTRACT

A cargo compartment module for an aircraft, including at least one floor, at least one side wall that is connected to the floor, upper installation points for connecting the side wall to the main deck, in particular transverse supports of the main deck, lower installation points for connecting the side wall to frames and/or other structural elements of the aircraft, wherein the side wall has reinforcements such that the side wall in an installed state forms part of the load-bearing structure of the aircraft and/or supports the main deck.

16 Claims, 6 Drawing Sheets

(56) References Cited

U.S. PATENT DOCUMENTS

2010/0140396 A1 6/2010 Guering
2016/0046392 A1 2/2016 Gorr et al.
2016/0304185 A1 10/2016 Vinches et al.

FOREIGN PATENT DOCUMENTS

| DE | 102015104230 | 9/2016 |
| EP | 1646558 | 4/2006 |
| EP | 2985232 | 2/2016 |
| WO | WO 87/06909 | 11/1987 |
| WO | WO 2016/150908 | 9/2016 |

* cited by examiner

STRUCTURE-REINFORCING CARGO COMPARTMENT MODULE

CROSS REFERENCE TO RELATED APPLICATIONS

This application claims priority to German Patent Application No. 102019132292.8, filed Nov. 28, 2019. The disclosure set forth in the referenced application is incorporated herein by reference in its entirety.

BACKGROUND OF THE INVENTION

Field of the Invention

The invention relates to a cargo compartment module that serves to install functional devices and other such essential elements inside a cargo compartment of an aircraft.

DESCRIPTION OF RELATED ART

A large number of functional devices are installed in the cargo compartment of an aircraft, for example roller conveyors on which containers (ULDs), pallets or the like are moved in the cargo compartment, shelves for holding the pieces of cargo, or lashing devices for lashing pieces of cargo. All these devices have to be connected to stable, load-bearing structures of the aircraft, that is to say to transverse supports which are connected to frames of the aircraft, or to the frames themselves. Installation on longitudinal supports is also necessary at times.

In addition, operating personnel must be able to walk into the cargo compartment. To this end, suitable surface units must be provided on the floor of the cargo compartment.

The installation of the various functional devices and of the surface units is complex.

It is known from EP 1 646 558 B1 to assemble complete floor modules including the functional devices and the load-bearing structures outside of the aircraft and then to install these in the aircraft.

It is known from WO 2016/150 908 A1 to use foldable inserts to equip a cargo compartment with a functional floor. In this case, various functional devices are already screwed to the respective inserts. Furthermore, in WO 2016/150 908 A1, the functional devices are used to connect the insert to load-bearing structures or support structures of the aircraft.

When constructing aircraft, there is generally the problem that the aircraft are delivered in very different configurations and/or are used in different configurations over the course of their life. Some aircraft are used only to transport cargo. Other aircraft have a cargo deck and a passenger deck, so that passengers and cargo can be transported.

There are also sometimes different requirements for equipping the lower deck. When configuring the cargo compartment in the lower region of the aircraft, one significant limitation is that the upper deck/main deck/passenger deck has to be supported by vertical struts in order to give the aircraft the necessary stability. The vertical struts therefore form part of the structure of the aircraft. The configuration freedom in the lower deck is greatly limited on account of these vertical struts. The installation and fitting thereof is also difficult when constructing an aircraft.

BRIEF SUMMARY OF THE INVENTION

Proceeding from this prior art, the problem addressed by the present invention is that of providing an improved cargo compartment module. In particular, the aim is for the cargo compartment module to make it easier to create a functional cargo compartment. Another aim is to provide an improved aircraft that can easily be manufactured and/or reconfigured.

The problem is solved by a cargo compartment module, an aircraft and a method as disclosed herein. In particular, the problem is solved by a cargo compartment module for an aircraft, comprising:
  at least one floor,
  at least one side wall that is connected to the floor,
  upper installation means for connecting the side wall to the main deck, in particular transverse supports of the main deck,
  lower installation means for connecting the side wall to frames and/or other structural elements of the aircraft,
wherein the side wall has reinforcements such that the side wall in an installed state forms part of the load-bearing structure of the aircraft and/or supports the main deck.

One significant advantage of the cargo compartment module is that the cargo compartment module itself provides load-bearing or supporting structures that support and/or secure the main deck. The vertical supports already mentioned in the introduction can therefore be omitted and/or can be provided to a lesser extent. If these vertical supports can be omitted, the lower internal area of the aircraft can in particular be used in a flexible manner. Furthermore, the available area can be used in full. By way of example, comfortable bunks can be installed for the flight crew.

The absence of the vertical supports also has a positive effect when installing the cargo compartment floor or the cargo compartment modules, since said supports do not unnecessarily constrict the installation area.

In order to perform the aforementioned support function, according to the invention the side wall is reinforced so that it can perform a load-bearing function in the installed state inside the aircraft.

In one embodiment, the at least one installation means is designed such that the side wall can be connected to the main deck and/or frames and/or structural elements of the aircraft by screw means. The installation means generally serves to establish a force-transmitting connection between the aircraft and the side wall and/or between the main deck and the side wall. In this regard, screw connections are particularly advantageous since they enable easy installation and removal.

In one embodiment, at least one component of the cargo compartment module is designed as a fibre composite material. Preferably, the floor and/or the side wall are made of a fibre composite material. The at least one side wall may be connected to the floor by way of fibre strands, which are preferably parts of fibre mats. In one embodiment, the floor and the side wall are produced as one element.

In one embodiment, the fibre composite material is designed at least partially as a sandwich structure. By way of example, the floor may comprise such a sandwich structure. Preferably, one or more hybrid cores are used in order to establish a high degree of stability while being of low weight. Such hybrid cores may also be contained in the at least one side wall or a ceiling structure of the cargo compartment module, which will be explained below.

In one embodiment, the hybrid core comprises at least a first core layer made of fibre-reinforced plastic (for example GRP or CFRP) and a second core layer made of fibre-reinforced plastic. A foam layer and/or another supporting structure, for example a honeycomb structure made of paper, cardboard or plastic, may be layered between said two core layers. The hybrid core, comprising the core layers as well as the foam layer or other supporting structures, is preferably impregnated with plastic resin at least such that the individual components are held together. Foam-free edge regions may be provided in order to establish a materially bonded connection between the core layers. Furthermore, these foam-free edge regions can be used to produce installation means, which will be connected to the load-bearing structures of the aircraft. Further explanations regarding the production and design of such a hybrid core can be found in WO 2016/150 908 A1, which is hereby explicitly incorporated in the content of the disclosure of the present application.

The floor may comprise at least one horizontal section and at least one side section that is inclined relative to the horizontal section. The horizontal section and/or the side section may be connected to a supporting structure (for example a floor support), in particular by way of a plurality of screw connections. The supporting structure may also be a load-bearing structure of the aircraft. Due to the design of the floor in the form of a horizontal section and inclined side sections, the cargo deck can be better adapted to the curves of the aircraft, thereby ensuring optimal use of the available space.

In one embodiment, the floor is connected to the at least one side wall by way of at least one joint, in particular by way of a joint section. The joint section may be formed by elastic regions. Particularly when the cargo compartment module is a cargo compartment module that is designed at least partially in the form of a fibre composite material, it is particularly advantageous to provide elastic regions in order to create the joint sections.

The fibre structures can connect the elements, while the elastic material ensures a bending or buckling, as a result of which the joint sections can easily be produced. Inter alia, this can greatly facilitate the process of manufacturing the cargo compartment module. Further explanations in this regard can likewise be found in WO 2016/150 908 A1, which is explicitly incorporated in the present application with regard to this disclosure as well.

In one embodiment, the thickness of the foam layer or honeycomb structure or supporting structure in the joint region is reduced such that easy buckling is possible. Alternatively, this region may be designed to be free of foam or free of the honeycomb structure in order to achieve said function.

However, the invention is not limited to such elastic joints. The joint regions may also be produced by known mechanical joints, for example hinges.

In one embodiment, the cargo compartment module comprises sealing lips that are arranged at edges of the module in order to seal transitions to other cargo compartment modules. It is advantageous if at least wide sections of the cargo compartment are produced using said cargo compartment modules. Sealing lips are advantageous in order to establish the gas-tightness that is often required between the individual modules. It is also possible to bevel the edge regions such that a flat form fit can be established between the individual cargo compartment modules. The sealing lips then ensure a high degree of sealing in this surface region.

At least the floor may be designed to form a gas-tight and/or water-tight barrier between the upper side and the underside. In one embodiment, edges of the floor and/or of at least one side wall and/or of at least one ceiling comprise sealing lips for sealing transitions to other cargo compartment modules.

In one embodiment, the cargo compartment module comprises a ceiling that is connected to at least one side wall. In one preferred embodiment, the ceiling for its part is foldable. To this end, joints, in particular joint sections, may be provided, as have already been explained.

In one embodiment, the cargo compartment module comprises a pair of side walls and a pair of side sections. The floor with the (sloping) side sections may be connected to the side walls in an articulated manner, as has already been explained. The side walls for their part may be connected to the ceiling in an articulated manner. The cargo compartment module may thus be designed as a kind of foldable hollow body or tunnel, which in its unfolded state forms the floor, sides and ceiling of the cargo compartment. In a folded state, the cargo compartment module has much smaller dimensions and is possibly flexible. It is therefore possible to introduce the cargo compartment module in the folded state easily into the aircraft in order thus to facilitate installation. The cargo compartment module will in the unfolded state be connected to the supporting structures, in particular by screwing.

In one embodiment, some of the functional elements of the cargo compartment module, in particular the side walls and/or the side sections and/or the horizontal section, are designed as rectangular panels or surface elements. The foldable ceiling may also be made from such rectangular panels.

In one embodiment, at least one tread pan having a tread region is provided, wherein the at least one tread pan is arranged in at least one side section of the floor. The tread region may be designed such that it extends substantially parallel to the horizontal section of the floor in the arranged and/or unfolded state of the cargo compartment module. In one embodiment, the tread pans are integrated in one piece in the respective side section.

One advantage of the tread pans is that they make it possible to walk past the side of the cargo when loading or unloading the cargo deck. This may be necessary if the loading or unloading process requires manual interaction. When loading pallets, for example, a net provided for securing the cargo on pallets may become caught on the cargo system. In this case, it is necessary to seek out the appropriate section of the cargo deck and to release the net. In the case of known cargo compartment modules, it was necessary to go around the side on the sloping side sections in order to do this. This is not easy and is sometimes even hazardous for personnel. The provision of (segmented) tread pans generally increases the possibilities for personnel to move around and get out of the way when loading and unloading cargo. Maintenance tasks, for example behind one of the side walls, are also easier if maintenance personnel have the horizontal surface of the tread pan available, which makes it possible to get closer to the side wall.

In one embodiment, the reinforcement is designed in the form of a lattice structure. If the cargo compartment module is made of fibre composite material, the reinforcement can be produced by incorporating additional fibres. Said lattice structure can therefore be created as a result of the fact that there are regions with a higher number of fibre layers and regions with a lower number of fibre layers. The lattice structure may include transverse struts.

The problem mentioned in the introduction is also solved by an aircraft having at least one cargo compartment module of the type that has been explained above. In one embodiment, the aircraft deck comprises a plurality of such cargo compartment modules. The cargo compartment modules can be connected to one another by way of the sealing lips that have already been explained.

In the aircraft according to the invention, the reinforcements of the respective cargo compartment module form load-bearing structures. In particular, the side walls of the module support the upper deck or main deck. Preferably, the reinforcements are screwed to the aircraft in place of or as a replacement for vertical supports ("stanchions").

Advantages are achieved which are similar to those that have already been described in connection with the cargo compartment module per se.

The problem mentioned in the introduction is also solved by a method for installing a cargo deck. In particular, this may be a method for producing an aircraft of the type that has already been explained.

The method may comprise the following steps:
 a) at least partially producing a cargo compartment module, comprising a floor and side walls connected to the floor;
 b) introducing the cargo compartment module into the aircraft;
 c) fastening the side walls on the one hand to the main deck of the aircraft and on the other hand to load-bearing structures of the aircraft, in particular close to the bilge, such that the side walls support the main deck against the load-bearing structures of the aircraft.

In one embodiment, the cargo compartment modules produced are cargo compartment modules of the type that has already been explained.

Advantages are achieved which are similar to those that have already been explained in connection with the individual cargo compartment modules.

In the method, the cargo compartment module can be introduced into the aircraft in a folded state, the cargo compartment module being opened out and/or unfolded prior to step c).

The method may also comprise fastening functional devices at predefined points on the floor outside of the aircraft, and fastening the functional device together with the floor to load-bearing structures of the aircraft. Ultimately, the functional devices can therefore be pre-installed at predefined points on the cargo compartment module. Once the cargo compartment module has been introduced, the functional devices are at least partially connected to the load-bearing structures of the aircraft, for example by screwing. In this respect, the functional devices for their part stiffen the cargo compartment module and ensure secure fastening of the cargo compartment module in the aircraft.

In the method according to the invention, the cargo compartment module may be made at least partially of a fibre composite material.

In one embodiment, numerous cargo compartment modules are introduced into the aircraft and are connected to one other, in particular in a gas-tight manner, at the time of installation.

BRIEF DESCRIPTION OF THE DRAWINGS

Further advantageous embodiments will emerge from the dependent claims.

The invention will be described below by means of a plurality of exemplary embodiments that will be explained in greater detail with reference to figures. In the figures.

DETAILED DESCRIPTION OF THE INVENTION

In the following description, the same reference numbers will be used for parts that are identical and for parts that have an identical function.

Figure 1:
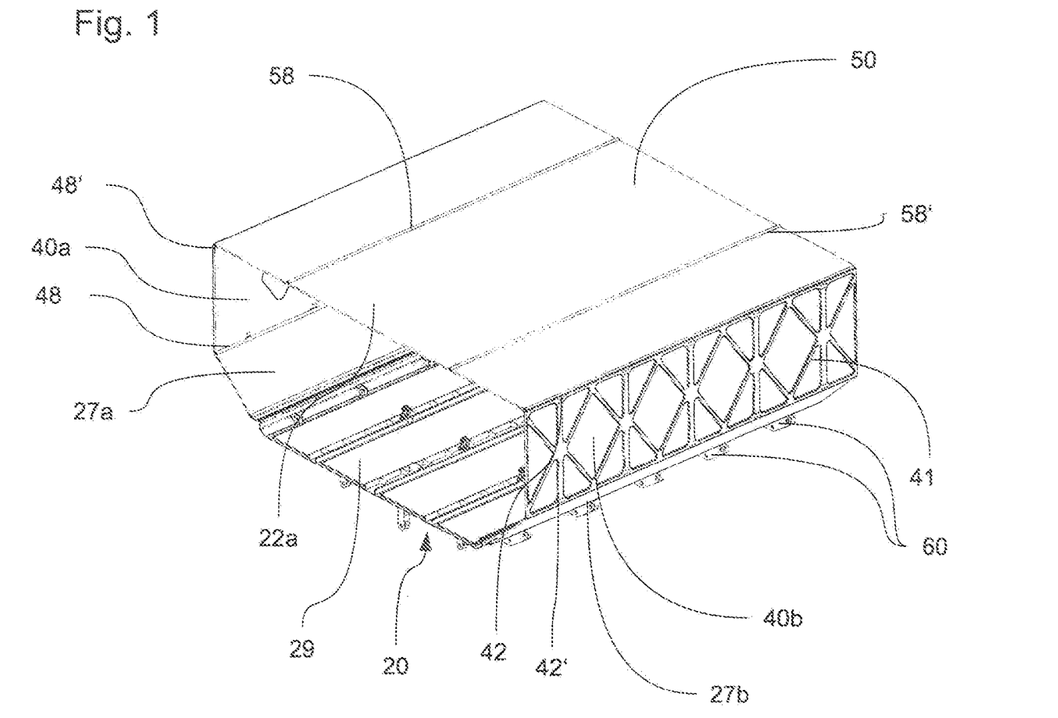
FIG. 1 shows a cargo compartment module in an unfolded state.

FIG. 1 shows a cargo compartment module according to the invention in an unfolded state. The cargo compartment module is substantially a hollow body, comprising the following components:
 floor 20;
 left-hand side wall 40*a*;
 ceiling 50;
 right-hand side wall 40*b*.

Said components are connected to one another in an articulated manner. For instance, a lower joint section 48 is provided between the floor 20 and respectively the left-hand side wall 40*a* and the right-hand side wall 40*b*. An upper joint section 48' connects respectively the left-hand side wall 40*a* and the right-hand side wall 40*b* to the ceiling 50.

The ceiling 50 is for its part foldable. In this regard, it is possible to provide two rectangular surface elements or panels and to connect these via a joint section. In the exemplary embodiment shown in FIG. 1, there are three rectangular surface elements, which are connected to one another by the joint sections 58 and 58'.

The floor 20 of the exemplary embodiment shown in FIG. 1 is also divided into three surface elements. These are the horizontal section 29, which is installed substantially horizontally in the aircraft and accommodates the vast majority of functional devices 30, 30', 30", 30''', and also a left-hand side section 27*a* and a right-hand side section 27*b*. In the exemplary embodiment described, the horizontal section 29 is also connected to the side sections 27*a*, 27*b* in an articulated manner by way of joint sections 28, 28'. In this respect, the floor 20 is also inherently foldable. According to the invention, however, it is also possible to make the floor 20 inherently rigid.

Figure 10:
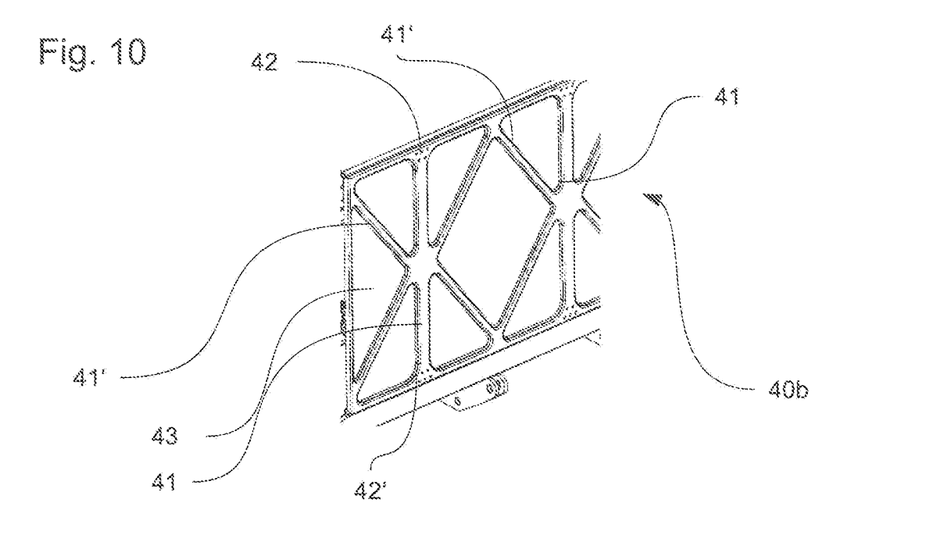
FIG. 10 shows a detail view of the right-hand side wall of the cargo compartment module of FIG. 1.

Both the left-hand side wall 40*a* and the right-hand side wall 40*b* have a reinforcement or a reinforcing structure. As shown in the detail in FIG. 10, this reinforcing structure comprises horizontally extending reinforcing struts 41 and diagonally extending reinforcing struts 41' (horizontal and transverse struts). These reinforcing struts 41, 41' form a lattice structure which is suitable for dissipating forces that are applied in the upper region of the side walls 40*a* or 40*b* into the lower region. Intermediate regions 43 are located between the reinforcing struts 41, 41'. Due to the design of the side walls 40a, 40b with the reinforcing struts 41, 41' and the intermediate regions 43, it is possible to produce a stable but lightweight structure.

In one exemplary embodiment, at least the side walls 40a, 40b are made of a fibre composite material. In this exemplary embodiment, the intermediate regions 43 have a lower number of layers of fibres used than the regions of the reinforcing struts 41, 41'. To produce the rigidity of the reinforcing struts 41, 41', the number of layers is increased. By way of example, the number of layers in this region may be twice as high as in the intermediate region 43. As an alternative or in addition, it is possible to provide a core structure which is surrounded by fibre layers in order to form the reinforcing struts 41, 41'. The core layer may be, for example, a foam core or a honeycomb core. One possibility for producing such a hybrid core will be explained below with reference to FIG. 9. According to the invention, the reinforcing struts 41, 41' may be designed in such a way.

Located in the upper and lower region of the side walls 40a, 40b are installation means and/or installation regions for connecting the side walls 40a, 40b to a main deck 6 on the one hand (cf. FIG. 8) and to the frames 2 of the aircraft on the other hand. In the exemplary embodiment shown in FIG. 10, upper screw-fastening points 42 and lower screw-fastening points 42' are provided for this purpose.

Figure 2:
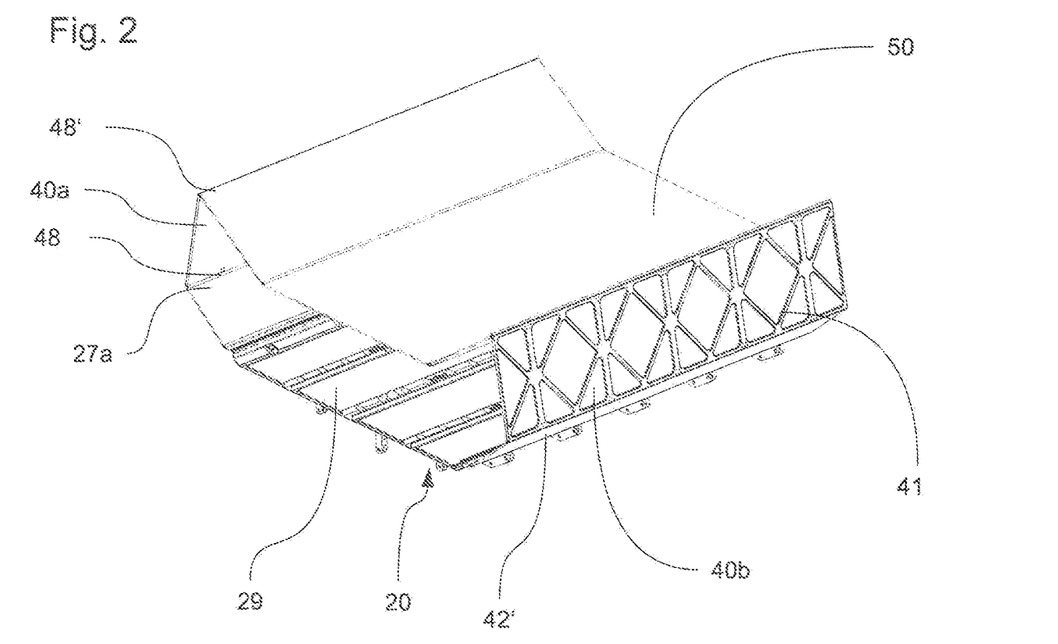
FIG. 2 shows the cargo compartment module of FIG. 1 in a partially folded state.
Figure 3:
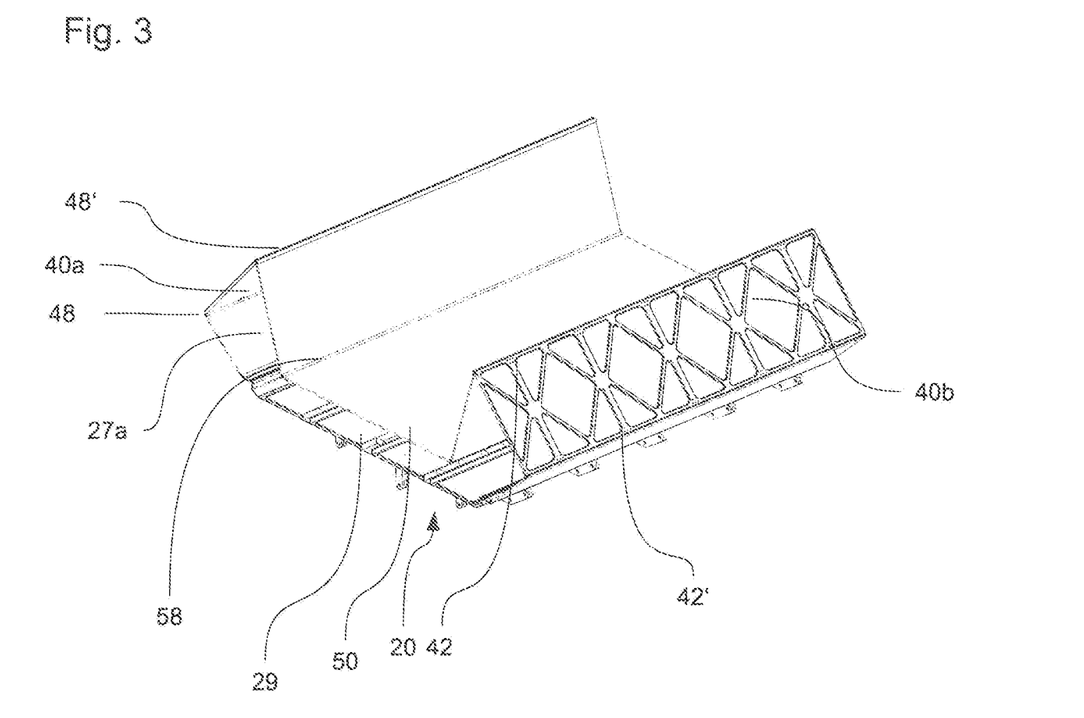
FIG. 3 shows the cargo compartment module of FIG. 1 in a further partially folded state.
Figure 4:
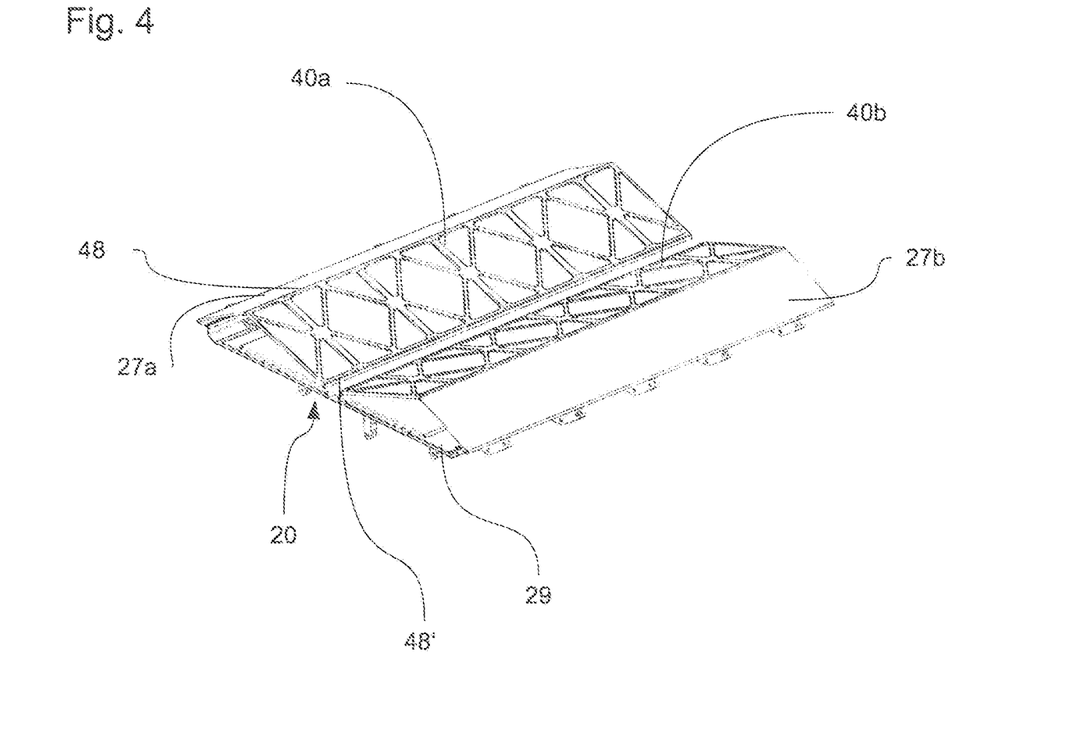
FIG. 4 shows the cargo compartment module of FIG. 1 in a folded state.
Figure 8:
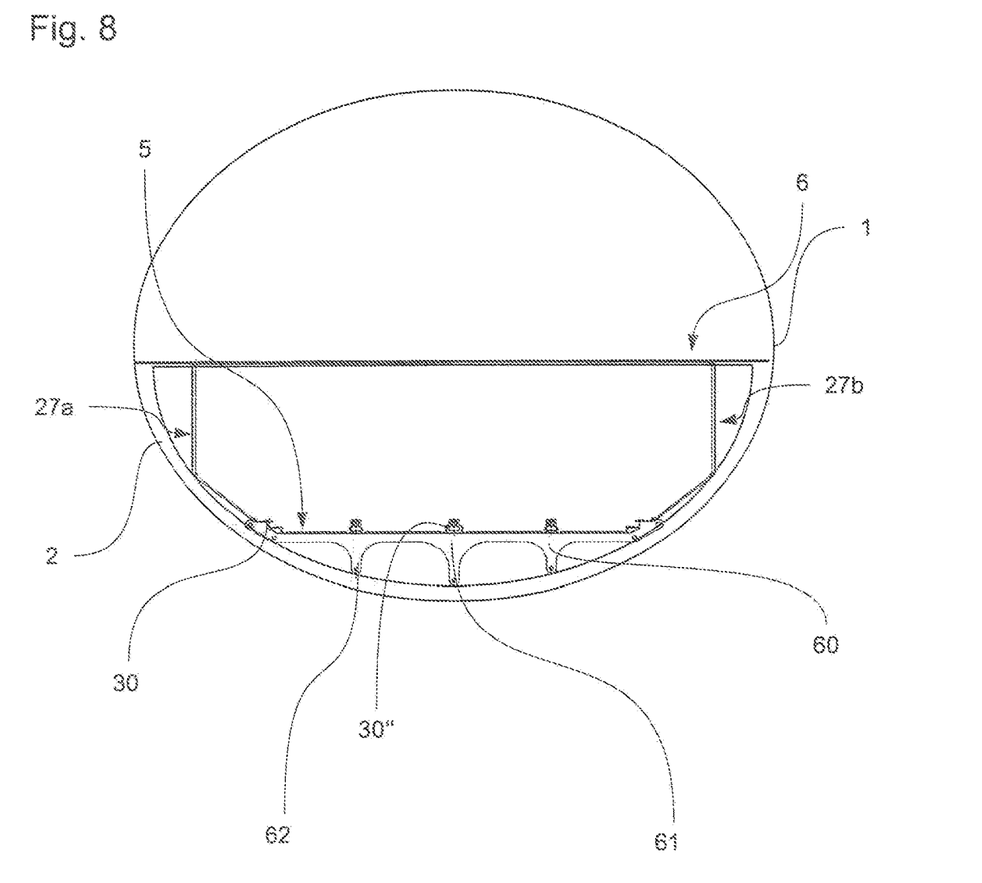
FIG. 8 shows a schematic section through an aircraft with an installed cargo compartment module.

FIGS. 2 and 3 show the cargo compartment module 10 in a partially folded state, and in FIG. 8 in a fully folded state. To pass from the state shown in FIG. 1 to the state shown in FIG. 4, first the middle surface element of the ceiling 50 is lowered (cf. FIG. 2). Thereafter, the side walls 40a and 40b are folded inwards such that they ultimately come to lie on this middle surface element (cf. FIG. 4).

Figure 5:
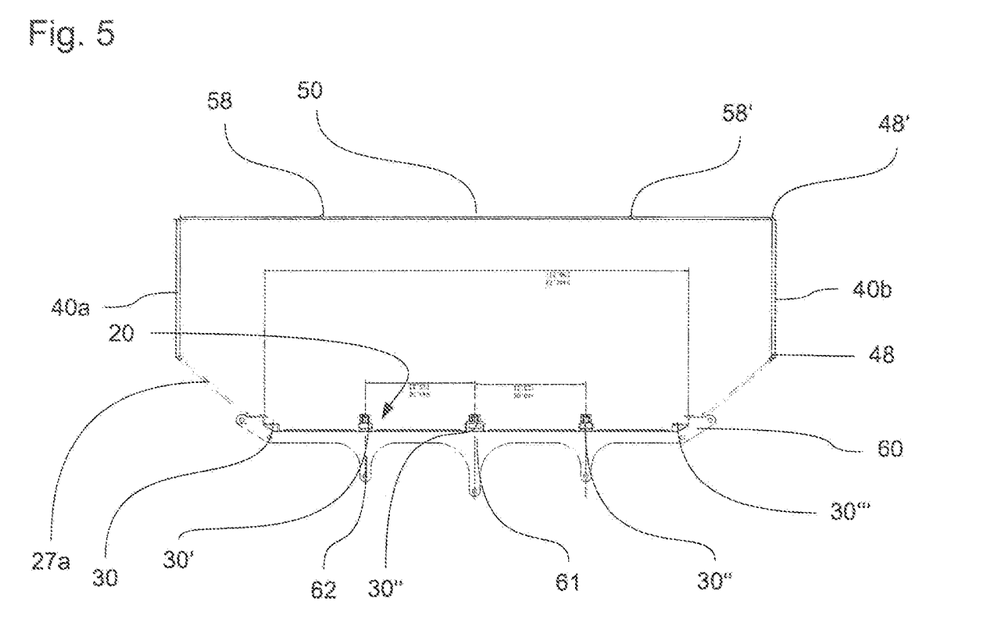
FIG. 5 shows a side view of the cargo compartment module corresponding to FIG. 1.
Figure 6:
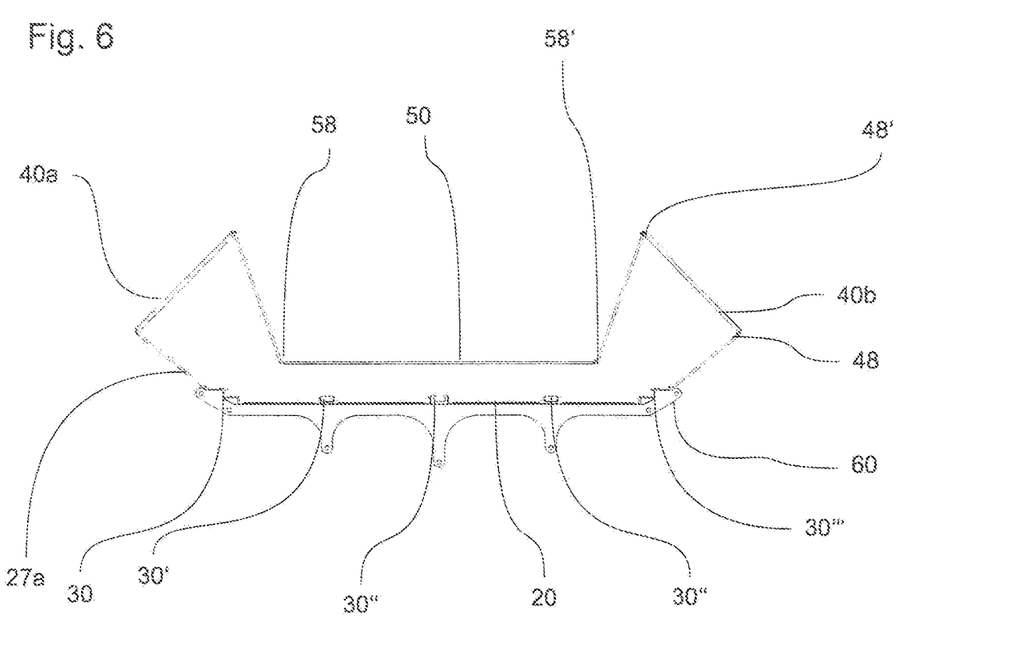
FIG. 6 shows a side view of the cargo compartment module corresponding to FIG. 3.
Figure 7:
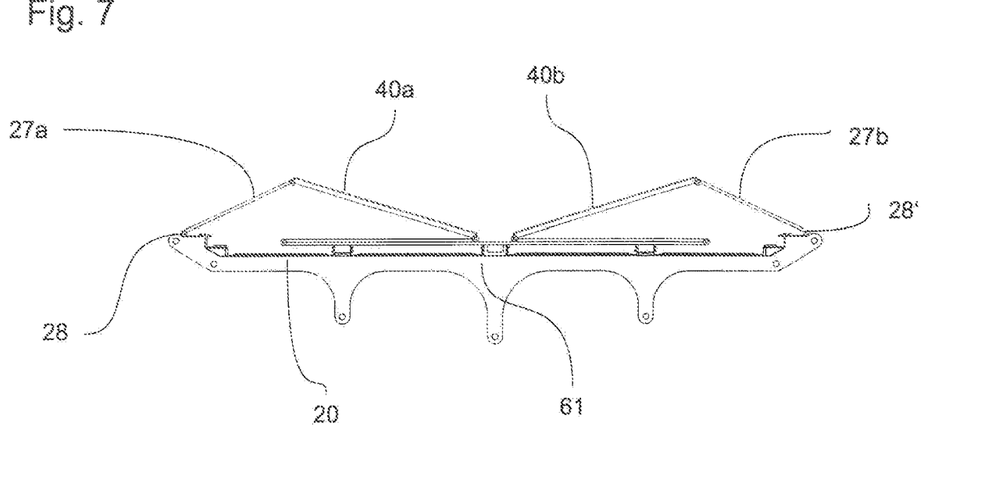
FIG. 7 shows a side view of the cargo compartment module corresponding to FIG. 4.

FIGS. 5 to 7 show a side view of the cargo compartment module 10 according to FIG. 1. Here, FIG. 1 and FIG. 5 correspond, FIG. 3 and FIG. 6 correspond, and FIG. 4 and FIG. 7 correspond.

In one exemplary embodiment, the cargo compartment module 10 is connected to a plurality of floor supports 60. These may be made, for example, of a fibre composite material. As can be seen from FIG. 1, they are arranged at regular intervals on the underside of the floor 20. The floor supports for their part have transverse supports 61 and feet 62. The floor supports 60 serve to further stiffen the floor 20 and to connect the latter to the load-bearing structures, in particular to the frames 2 of the aircraft.

In the exemplary embodiment shown in FIG. 5, functional devices are arranged in the interior of the cargo compartment module 10. These are side rails 30, 30''', which extend in the longitudinal direction of the aircraft, and U-shaped profiles 30', 30'', which are able to receive bars and other functional devices, such as PDUs for example. The U-shaped profiles 30', 30'' are screwed to the floor supports 60 such that they stiffen the respective cargo compartment module 10. In one preferred exemplary embodiment, sections of the floor 20 are located between the U-shaped profiles 30', 30'' and the floor supports 60 such that the installation of the U-shaped profiles 30', 30'' at the same time leads to the fastening of the cargo compartment module 10.

In another exemplary embodiment, the floor support 60 is part of the load-bearing structure of the aircraft or at least is already installed in the aircraft prior to the installation of the cargo compartment module. In this exemplary embodiment, the cargo compartment module 10, without the floor support 60 and possibly already equipped with functional devices, is introduced into the aircraft, wherein, after being introduced, the floor 20 is screwed to the floor supports 60, in particular using the functional devices.

The side rails 30, 30''' may also be screwed to the floor supports 60. As an alternative or in addition, as shown schematically in FIG. 9, the side rails 30, 30''' may be connected directly to the frames 2 of the aircraft by way of fastening screws, for example fastening screw 31, in order to fix the cargo compartment module 10 in place inside the aircraft.

FIG. 8 shows a schematic section through an aircraft, wherein a cargo compartment module 10 of the type that has already been described in multiple exemplary embodiments is arranged in the interior of the aircraft. The aircraft has an outer skin 1, which is shown schematically. This outer skin is fastened to frames 2. The internal area of the aircraft is divided substantially into two halves by the main deck 6. The cargo compartment module 10 supports this main deck 6 against the frames 2. To this end, the side walls 40a, 40b have the above-described supporting structure, which will be explained in greater detail in FIG. 10. In order to be able to dissipate forces acting on the main deck 6 into the lower region of the load-bearing structure, for example the frames 2, of the aircraft, the side walls 40a, 40b are connected to transverse supports of the main deck 6, for example by way of suitable brackets or protrusions. In particular, the upper screw-fastening points 42 can be used for this.

Such brackets or adapters may also be provided in the lower region of the side walls 40b, these brackets or adapters being connected to the side walls 40a, 40b using the lower screw-fastening points 42'. These brackets may be connected to the frames 2 or to other load-bearing structures of the aircraft.

In the exemplary embodiment shown in FIG. 8, a further stiffening of the aircraft is achieved by the articulated connection of the side walls 40a, 40b to the floor 20 and also to the ceiling 50.

Figure 9:
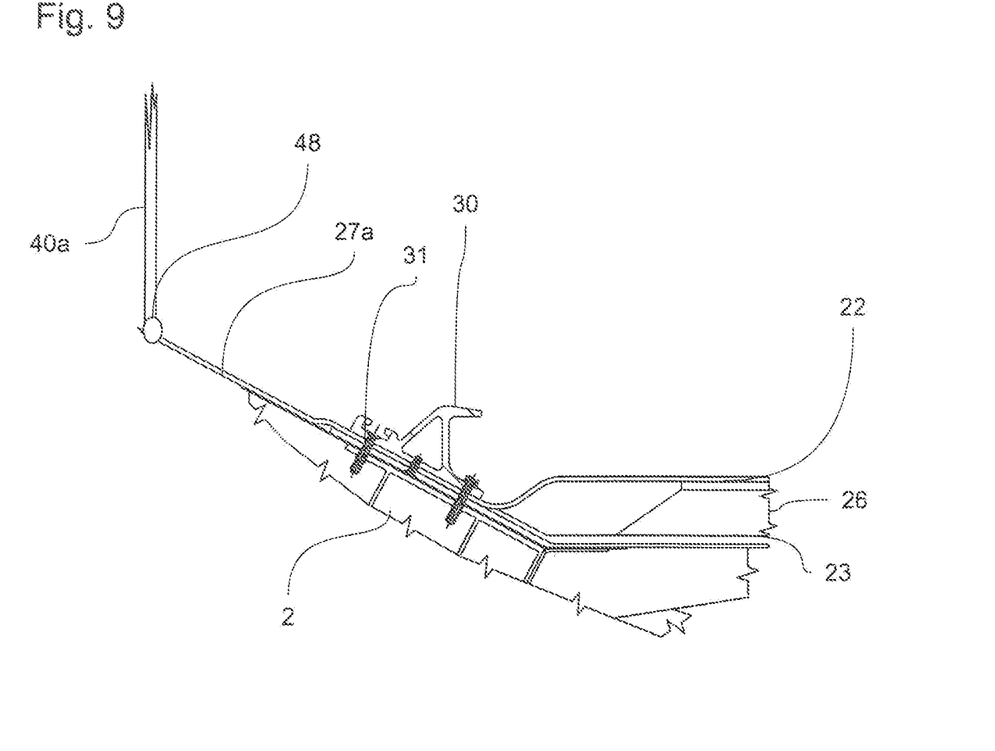
FIG. 9 shows a schematic partial section through an aircraft with an installed cargo compartment module, with one side section being shown.

Besides a possibility, according to the invention, for fastening the floor 20 to the load-bearing structures of the aircraft, FIG. 9 shows a further aspect relevant to the invention, which is optionally used in the cargo compartment module 10. According to the exemplary embodiment of FIG. 9, the horizontal section 29 of the floor 20 is constructed in the form of a hybrid core. This means that the floor 20 comprises a kind of sandwich structure, in which a foam is provided between a floor upper side 22 and a floor underside 23. The floor upper side and the floor underside are formed by a large number of fibre layers, for example glass fibres and/or carbon fibres. The core in the form of the foam 26 is enclosed by these layers. In one exemplary embodiment, the layers of the floor upper side 22 and the floor underside 23 contact one another in the edge region. No foam 26 is therefore provided in this region. The sandwich structure ensures that the floor 20 has a high degree of stiffness while being of relatively low weight. The foam 26 may be partially impregnated with resin during the manufacturing process. Instead of the foam 26, a honeycomb structure may also be used to increase the stiffness of the floor 20.

Figure 11:
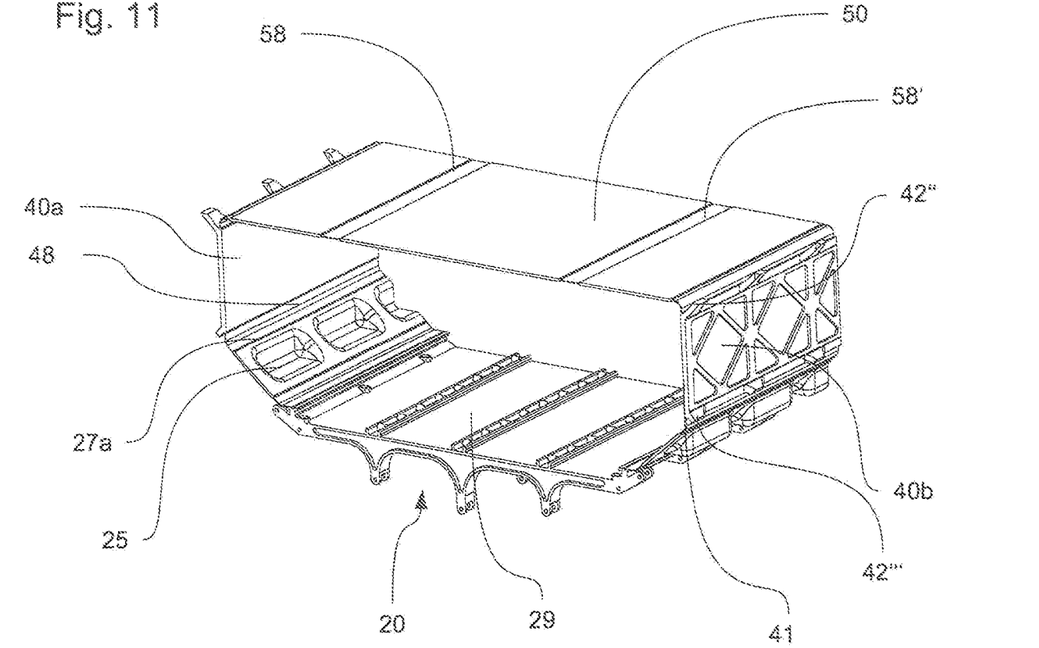
FIG. 11 shows a cargo compartment module similar to that of FIG. 1, with tread pans, in the unfolded state.

FIG. 11 shows another exemplary embodiment of the cargo compartment module according to the invention. The cargo compartment module is shown in an unfolded state in FIG. 11. One main difference of the cargo compartment module according to FIG. 11 compared to that of FIG. 1 is that in each case a plurality of tread pans 25 are provided on the left-hand side section 27a and on the right-hand side section 27b. The tread pans 25 serve to enable a person to pass along the side of cargo containers and cargo pallets that do not fill the entire cargo compartment. In the exemplary embodiment shown, the tread pans 25 have a tread region, which in the state shown in FIG. 11 extends substantially parallel to the horizontal section 29 of the floor 20. A relatively comfortable movement can thus be ensured.

The tread pans 25 are an integral part of the respective side section 27*a*, 27*b*. These can readily be integrated when manufacturing the side sections 27*a*, 27*b*. In particular, when manufacturing the side sections 27*a*, 27*b* from a fibre composite material, the tread pans 25 can be formed prior to curing the epoxy resin used.

In the exemplary embodiment shown, the tread pans 25 extend over an area between 50 and 100 cm and are each spaced apart from one another by at most 50 cm.

According to the invention, sub-sections of the tread pans 25 may also be formed in a cargo compartment module 10 (cf. FIG. 11), in which case a complete tread pan 25 is obtained only when multiple cargo compartment modules 10 are joined together. The cargo compartment module 10 to be added then has the missing part of the tread pan 25.

The screw-fastening points 42, 42' also differ on the cargo compartment module 10 shown in FIG. 11 compared to that of FIG. 1. Here, laterally protruding fastening profiles 42" are provided in the upper region of the cargo compartment module 10 for fastening and supporting the main deck 6. Said profiles support the main deck 6 in the unfolded state. Located in the lower region of the side walls 40*a*, 40*b* are the fastening profiles 42''', which are supported on the structure, for example on the frames 2 of the aircraft. In one exemplary embodiment, the fastening profiles 42", ''' fit into the aircraft such that no additional screwing is necessary in order to dissipate forces acting on the main deck 6 into the aircraft fuselage. Preferably, the fastening profiles 42", 42''' for their part will be screwed and/or adhesively bonded to the main deck 6 and for example to the frames 2.

Figure 12:
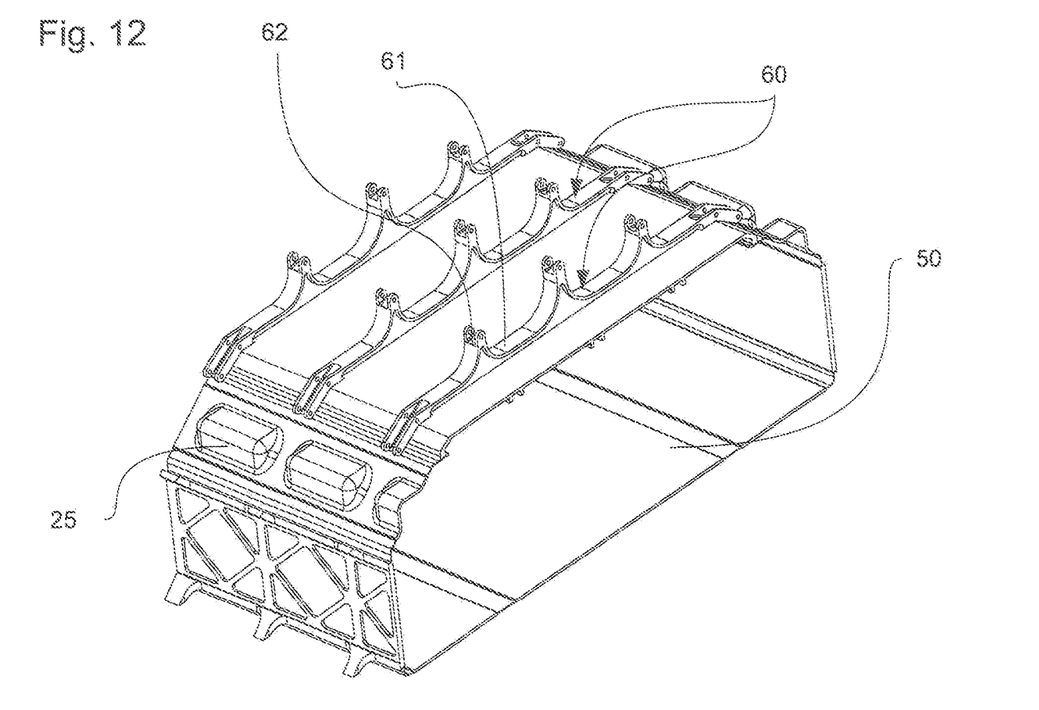
FIG. 12 shows the cargo compartment module of FIG. 11 in a view from below.

FIG. 12 shows the cargo compartment module 10 according to FIG. 11 in a view from below. In this view, the floor supports 60 with the feet 62 and the associated fastening points are clearly visible. These stiffen the cargo compartment module 10 in the transverse direction. In the exemplary embodiment shown, three floor supports 60 are provided per cargo compartment module 10.

In the exemplary embodiments described, the transverse supports have feet 62 for at least partially fastening to the frames 2. In another exemplary embodiment according to the invention, the feet 62 can be omitted. In this exemplary embodiment, only the ends of the transverse supports 61 are screwed to the structure of the aircraft, for example to the frames 2. In this constellation, the transverse support 61 spans the bilge in a freely floating manner. The transverse support 61 is dimensioned such that it can dissipate the necessary forces via the ends into the load-bearing structure of the aircraft.

In the exemplary embodiments described, a relatively large number of joint sections are used to make the cargo compartment module 10 foldable. In theory, however, it is possible to achieve a similar effect using a much smaller number. By way of example, the ceiling 50 might be of two-part design, that is to say provided with a gap, and only the connection between the floor 20 and the side walls 40*a*, 40*b* might be articulated. In this embodiment, the joint sections 48' shown in FIG. 1 would be stiff so that, regardless of the state of unfolding, a right angle is formed between the respective ceiling section and the respective side wall 40*a* or 40*b*.

Furthermore, in the exemplary embodiments, screw-fastening points 42, 42' are arranged on the side walls 40*a*, 40*b*. According to the invention, however, it is also possible to arrange these screw-fastening points 42, 42' alternatively or additionally in the ceiling 50 and/or on the side sections 27*a*, 27*b*, preferably close to the lower joint sections 48.

In the exemplary embodiments described, the side walls 40*a*, 40*b* have reinforcing struts 41, 41'. However, it is also possible to omit these reinforcing struts 41, 41' and instead to dimension the side walls 40*a*, 40*b* to be suitably thicker so that they can absorb the necessary loads. In this respect, for example, the intermediate regions 43 may be omitted.

In this connection, the production of the reinforcing struts 41, 41' by increasing the number of layers has also been described. However, such reinforcing struts may also be produced according to the invention by layering suitably stiffer materials.

In the embodiments described, the cargo compartment module 10 according to the invention has been used to line the lower region of the aircraft. In theory, however, it is conceivable to use a suitably modified cargo compartment module also to line the upper region, that is to say above the main deck. Numerous possible variations of the invention become apparent on the basis of the exemplary embodiments described. It should be noted at this point that all the parts described above, considered alone and in any combination, in particular the details shown in the drawings, are claimed as essential to the invention.

LIST OF REFERENCE SIGNS

1 outer skin
2 frames
3 transverse support
4 longitudinal support
5 cargo deck
6 main deck
10 cargo compartment module
20 floor
21 fixing screw
22 floor upper side
23 floor underside
25 tread pan
26 foam
27*a*, 27*b* side section
28, 28' articulated section
29 horizontal section
30, 30', 30", 30''' functional devices, for example side rails, U-shaped profile
31 fastening screw
40*a*, 40*b* side wall
41, 41' reinforcing struts
42, 42' screw-fastening points
42", 42''' fastening profile
43 intermediate region
48, 48' articulated section
50 ceiling
58, 58' articulated section
60 floor support
61 transverse support
62 foot

The invention claimed is:

1. A cargo compartment module for an aircraft, the cargo compartment module comprising:
   a floor,
   a side wall that is connected to the floor, upper installation means for connecting the side wall to a main deck of the aircraft, and lower installation means for connecting the side wall to a structural element of the aircraft, wherein the side wall has reinforcements such that the side wall in an installed state forms part of a load-bearing structure of the aircraft and/or supports the main deck relative to the structural element of the aircraft, and wherein the floor and the side wall are connected to one another in an articulated manner such that the cargo compartment module can be brought from a folded state to an unfolded state for installation in the aircraft.

2. The cargo compartment module according to claim 1, wherein at least one of the upper and lower installation means is configured for connection by screw means.

3. The cargo compartment module according to claim 1, wherein the floor and/or the side wall is a fibre composite material, and wherein the side wall is connected to the floor by fibre strands.

4. The cargo compartment module according to claim 1, wherein the floor comprises at least one horizontal section and at least one side section that is inclined relative to the horizontal section, wherein the horizontal section and/or the side section is connected to a supporting structure.

5. The cargo compartment module according to claim 1, wherein the floor is connected to the side wall by way of a joint section in the form of at least partially elastic regions.

6. The cargo compartment module according to claim 1, wherein the cargo compartment module further comprises sealing lips that are arranged at edges of the floor and/or of the side wall and/or of at least one ceiling in order to seal transitions to other cargo compartment modules.

7. The cargo compartment module according to claim 1, wherein the side wall comprises a sandwich structure having a hybrid core.

8. The cargo compartment module according to claim 1, comprising:
a foldable ceiling, which is connected to the side wall in an articulated manner.

9. The cargo compartment module according to claim 1, comprising:
the side wall and a further side wall;
a pair of side sections of the floor;
wherein the floor with the side sections, the side walls and a ceiling are connected to one another in an articulated manner by way of joint sections such that the cargo compartment module can be brought from a folded state to an unfolded state for installation in the aircraft.

10. The cargo compartment module according to claim 1, comprising:
at least one tread pan having a tread region, wherein the at least one tread pan is arranged in at least one side section of the floor.

11. An aircraft having at least one cargo compartment module according to claim 1.

12. A method for installing a cargo deck for producing an aircraft, the method comprising the steps of:
a) producing a cargo compartment module according to claim 1;
b) introducing the cargo compartment module into the aircraft;
c) fastening the side wall to a main deck of the aircraft and to a load-bearing structure of the aircraft such that the side wall supports the main deck against the load-bearing structure of the aircraft.

13. The method according to claim 12, wherein the cargo compartment module is introduced into the aircraft in a folded state, the cargo compartment module being opened out and/or unfolded prior to step c).

14. The method according to claim 12, comprising:
fastening functional devices at predefined points on the floor outside of the aircraft;
fastening the functional devices together with the floor to load-bearing structures of the aircraft.

15. The method according to claim 12, wherein the cargo compartment module is made at least partially of a fibre composite material.

16. A cargo compartment module for an aircraft, the cargo compartment module comprising:
a ceiling,
a side wall that is connected to the ceiling,
upper installation means for connecting the side wall to a main deck of the aircraft, and
lower installation means for connecting the side wall to a structural element of the aircraft,
wherein the side wall has reinforcements such that the side wall in an installed state forms part of a load-bearing structure of the aircraft and/or supports the main deck relative to the structural element of the aircraft, and
wherein the ceiling and the side wall are connected to one another in an articulated manner such that the cargo compartment module can be brought from a folded state to an unfolded state for installation in the aircraft.

* * * * *